(12) United States Patent
Krause et al.

(10) Patent No.: US 9,631,664 B2
(45) Date of Patent: Apr. 25, 2017

(54) BOLTED JOINT INNER THREAD COATING AND METHODS OF MANUFACTURING

(75) Inventors: Roger A. Krause, Howell, MI (US); Christopher Hall, New Hudson, MI (US); Dan H. Dinu, Windsor (CA)

(73) Assignee: Mahle International GmbH (DE)

( * ) Notice: Subject to any disclaimer, the term of this patent is extended or adjusted under 35 U.S.C. 154(b) by 725 days.

(21) Appl. No.: 13/593,995

(22) Filed: Aug. 24, 2012

(65) Prior Publication Data
US 2014/0053798 A1 Feb. 27, 2014

(51) Int. Cl.
| | |
|---|---|
| *F02B 75/02* | (2006.01) |
| *F02B 75/22* | (2006.01) |
| *F02B 75/32* | (2006.01) |
| *F16B 39/22* | (2006.01) |
| *F16C 9/04* | (2006.01) |
| *F02B 75/04* | (2006.01) |
| *F16J 1/14* | (2006.01) |

(Continued)

(52) U.S. Cl.
CPC .............. *F16B 39/225* (2013.01); *F16C 9/04* (2013.01); *F01B 9/047* (2013.01); *F02B 1/00* (2013.01); *F02B 3/06* (2013.01); *F02B 41/00* (2013.01); *F02B 41/04* (2013.01); *F02B 75/048* (2013.01); *F02B 75/32* (2013.01); *F02B 2075/025* (2013.01); *F02B 2700/023* (2013.01); *F16B 33/008* (2013.01); *F16B 33/06* (2013.01); *F16C 7/023* (2013.01); *F16J 1/14* (2013.01); *Y10T 29/49288* (2015.01); *Y10T 29/49966* (2015.01)

(58) Field of Classification Search
CPC .... F02B 1/00; F02B 3/06; F02B 41/00; F02B 75/32; F02B 2075/025; F02B 41/04; F02B 75/048; F02B 2700/023; F16C 7/023; F16C 9/04; F16J 1/14; F01B 8/023; F01B 9/047; F01B 9/06; F02F 7/0053; F02F 7/0007; F02F 7/0012; F05C 2201/021

USPC ............ 123/1 R, 195 R, 197.3, 197.4, 197.1
See application file for complete search history.

(56) References Cited

U.S. PATENT DOCUMENTS

| | | | |
|---|---|---|---|
| 4,436,443 A * | 3/1984 | McCormick | 403/14 |
| 4,458,555 A * | 7/1984 | Holtzberg et al. | 74/579 E |

(Continued)

OTHER PUBLICATIONS

HyperWorks, Realize and Hole Detect Details, Altair Engineering, Inc. Release 12.0110.*

*Primary Examiner* — Hung Q Nguyen
*Assistant Examiner* — Charles Brauch
(74) *Attorney, Agent, or Firm* — Fishman Stewart PLLC (57) ABSTRACT

A device and corresponding methods for applying a coating material are disclosed. The method may include applying a first coating material on a threaded region of an opening in a multi-piece assembly, and inserting at least one fastener to the threaded region. The fastener may include a mating thread selectively secured to the threaded region of the opening to create a first friction interface between the fastener and the multi-piece assembly. The method may further include tensioning the fastener between a load surface of the multi-piece assembly and the mating thread. In one example, the load surface may define in part a second friction interface between the fastener and the multi-piece assembly that is spaced away from the threaded region such that the first coating material does not influence the second friction interface. In another example, the first coating material may be applied in a substantially uniform thickness.

20 Claims, 5 Drawing Sheets

(51) Int. Cl.

*F01B 9/04* (2006.01)
*F02B 3/06* (2006.01)
*F02B 1/00* (2006.01)
*F02B 41/04* (2006.01)
*F02B 41/00* (2006.01)
*F16C 7/02* (2006.01)
*F16B 33/00* (2006.01)
*F16B 33/06* (2006.01)

(56) References Cited

U.S. PATENT DOCUMENTS

| | | | | |
|---|---|---|---|---|
| 4,888,214 | A | * | 12/1989 | Duffy et al. .................. 427/183 |
| 5,366,298 | A | * | 11/1994 | Toshimitsu et al. .......... 384/107 |
| 5,458,984 | A | * | 10/1995 | Negwer ........................ 428/547 |
| 5,843,532 | A | * | 12/1998 | Dodds ........................ 427/430.1 |

\* cited by examiner

BOLTED JOINT INNER THREAD COATING AND METHODS OF MANUFACTURING

BACKGROUND

Traditional internal combustion engines rely on a connecting rod for transmitting combustion power from a piston main body to a crank shaft of the engine. Connecting rods are typically arranged with a first end having an opening or aperture and a second end larger than the first end, which includes a bearing cap that is attached to the second large end and creates an aperture when assembled. Generally, the first small end aperture is connected to the piston, while the second large end is connected to the crank shaft. Typically, a metallic bearing will be positioned either around the crank shaft or within an aperture contact surface of the connecting rod second end and the bearing cap. This provides a rotating surface between the connecting rod and the crank shaft.

The connecting rod second end and bearing cap each include corresponding openings that allow a fastener to secure the bearing cap to the connecting rod second end. When a fastener is a bolt, the opening within the bearing cap may be threaded to receive the bolt. It may also be a stud. Accordingly, the connecting rod may be secured to the crank shaft with the fasteners.

The fasteners are generally mass produced and may include a corrosion resistant coating to minimize material breakdown during shipping and storage. The fasteners may include application of a friction material such as an adhesive coating to the threads in the case of a threaded bolt received in a mating threaded opening to facilitate a more permanent connection of the connecting rod second end and bearing cap.

In theory the adhesive coating increases friction between the threads of the fastener and the corresponding threads in the second end of the connecting rod to keep the fastener in place after assembly. In practice, however, use of an adhesive coating has generally been unreliable. For example, the adhesive may not be uniformly applied such as by way of dipping operations typical of such coating applications. Additionally, fasteners coated with an adhesive coating may be damaged during shipping, e.g., by rubbing against adjacent fasteners within packaging, causing the adhesive coating to wear off. In some situations, moreover, the corrosion coating may interact unfavorably with the adhesive coating, minimizing the effectiveness of the adhesive coating. Flaws within the fastener opening or to the fastener itself may also hinder effectiveness.

Even if the adhesive coating is appropriately applied to a fastener there are other challenges. For example, there is a possibility of shearing the coating off of the fastener during insertion, which may result in an uneven coating layer on the fastener and a build-up of coating under the head of the fastener in the case of a bolt. The build-up of coating at the mating surface between the fastener head and the bearing cap may cause inconsistencies in applying torque to the fastener during assembly, resulting in uneven load distributions and potentially catastrophic failure of the fastened joint.

Any of these foregoing issues may lead to unscheduled maintenance of an engine to re-tighten and/or re-apply the adhesive coating even after assembly is complete. Accordingly, there is a need for a more uniform application of a friction material, e.g., adhesive coating, at the fastened joint between the connecting rod and the bearing cap that is economical for mass manufacturing applications.

BRIEF DESCRIPTION OF THE DRAWINGS

While the claims are not limited to the specific illustrations, an appreciation of various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

According to various exemplary illustrations, a method of applying a coating material is disclosed. In some exemplary illustrations, a multi-piece assembly (e.g., a connecting rod), may include a threaded opening receiving a corresponding threaded fastener. An exemplary method may include applying a coating material, e.g., an adhesive coating, on a threaded region of an opening or aperture in a multi-piece assembly, and inserting at least one fastener to the threaded region. In some exemplary illustrations, the coating material may be applied in a substantially uniform thickness. The fastener may include a mating thread selectively secured to the threaded region of the opening to create a first friction interface between the fastener and the multi-piece assembly. The method may further include tensioning the fastener by engaging the mating thread to the threaded region of the opening. A mating surface of the multi-piece assembly generally may define a second friction interface between the fastener and the multi-piece assembly that is spaced away from the threaded region, such that the first coating material does not influence the second friction interface.

Illustrative methods may generally be utilized for any multi-piece assembly having an opening. As further described below, in some exemplary illustrations a coating is applied to an opening in a connecting rod assembly.

Figures 1A, 1B:
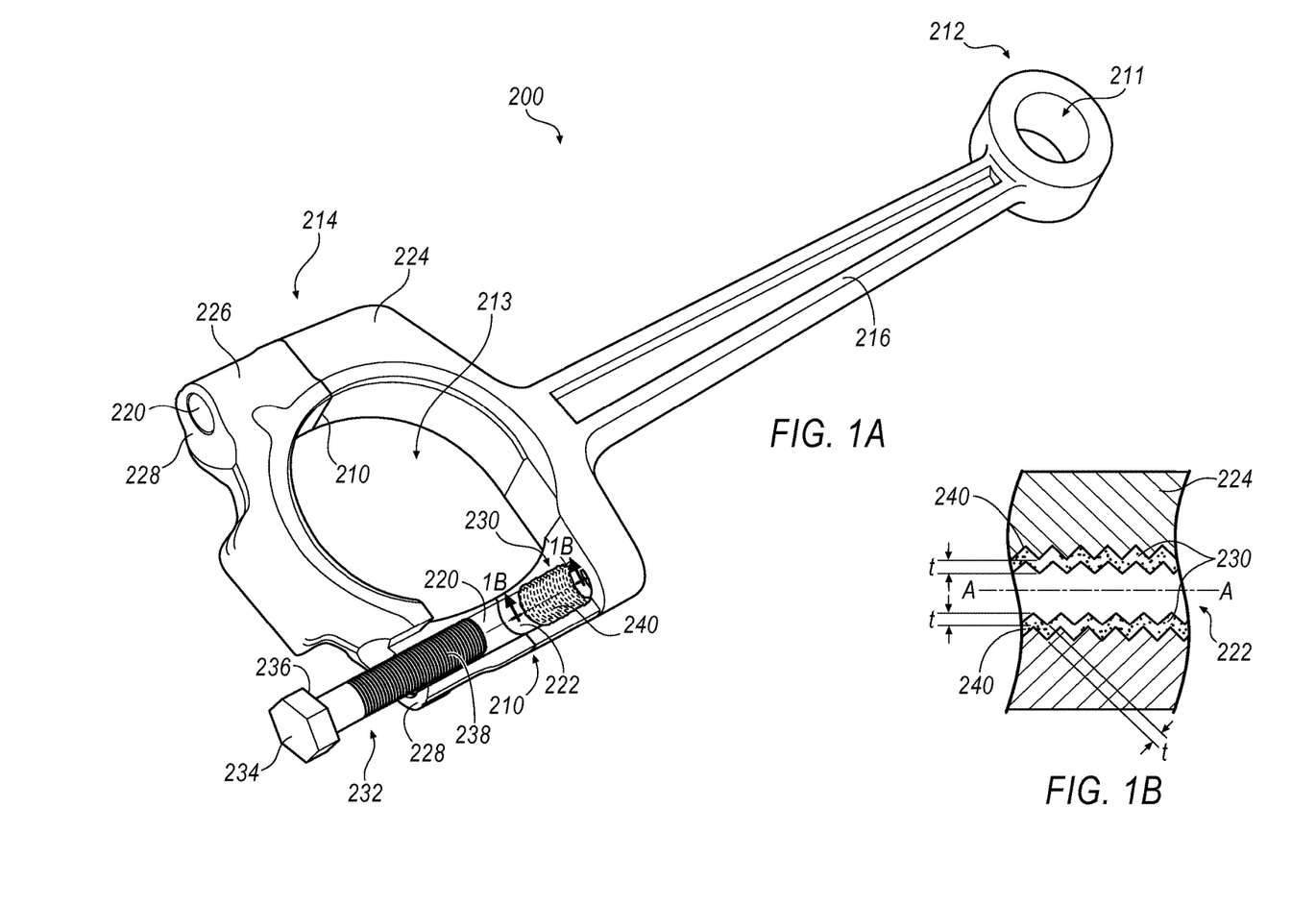
FIG. 1A is a perspective view of an exemplary multi-piece assembly, including a connecting rod.
FIG. 1B is a section view of the exemplary multi-piece assembly of FIG. 1A.

FIG. 1 illustrates an exemplary multi-piece assembly, e.g., a connecting rod 200. The connecting rod assembly 200 may include a load bearing shaft 216 extending between a piston end 212 defining a piston end aperture 211 and a crank shaft end 214 defining a crank shaft end aperture 213. The crank shaft end 214 may include a connecting rod portion 224 and a corresponding bearing cap 226. The bearing cap 226 may be selectively fastened to the connecting rod portion 224 at a connecting rod assembly joint 210. The crank shaft end aperture 213 defined by the connecting rod portion 224 and the bearing cap 226 generally be a complete annular section, e.g., in generally semi-circular portions defining a generally cylindrical aperture 213, as shown. The aperture 213 may be circular in section, or may be offset such that it defines an oval cross-section. A separate bearing (not shown) may also be positioned between the inner circumference of the crankshaft mating end and the corresponding crankshaft surface (not shown).

The connecting rod portion 224 and the bearing cap 226 may be mechanically fastened at the joint 210 utilizing a fastener 232, e.g., a bolt or a threaded stud. The fastener 232 may be received within an opening 220 that extends through the bearing cap 226 and abuts a corresponding opening 222 defined by the connecting rod portion 224. Alternatively, the connecting rod portion 224 may include a threaded stud (not shown) with a corresponding nut (not shown) or other fastening device (not shown), as mentioned above. In practice, the fastener 232 may be threaded and secured into locking alignment with corresponding threads 230 included in at least one of the openings 220, 222. Where threads 230 are defined solely by the connecting rod portion 224, the corresponding opening 220 in the bearing cap 226 may define a clearance around the fastener 232, thereby allowing insertion of the fastener 232 through the opening 220 preventing interference or contact between the sidewalls of the opening 220 and the fastener 232.

The fastener 232 may include a fastener head 234 and integrated threads 238. The fastener head 234 may also include a head mating face 236 that engages a fastener head spot face 228 that may be included on an outer surface of the bearing cap 226 adjacent the opening 222. The head mating face 236 may abut the fastener head spot face 228 when the bearing cap 226 is secured to the connecting rod portion 224. In other exemplary illustrations, a washer (not shown) may be interposed between the fastener head 234 and fastener head spot face 228. The fastener 232 may generally be in tension between the threaded connection formed by the engagement of the fastener threads 238 with the threads 230 of the opening 222, and the abutment of the fastener head 234 against the spot face 228 or washer (not shown). As illustrated, the fastener 232 is positioned with the fastener threads 238 partially extending into the opening 222 on the bearing cap 226. The spot face 228 may be thereby spaced away from the threaded connection between the fastener threads 238.

The fastener 232 may include a coating (not shown). The coating may be any type that is convenient. For example, a corrosion-resistant coating may be applied during production of the fastener 232 to prevent rusting or other corrosion during storage, transportation, or use. The corrosion-resistant coating may be applied in any manner that is convenient, including dipping, submersion bath, spraying, or the like, merely as examples. In other exemplary illustrations, the fastener 232 may be coated with oil or any other lubricant, or with a manganese-phosphate coating, merely as examples.

Figure 2:
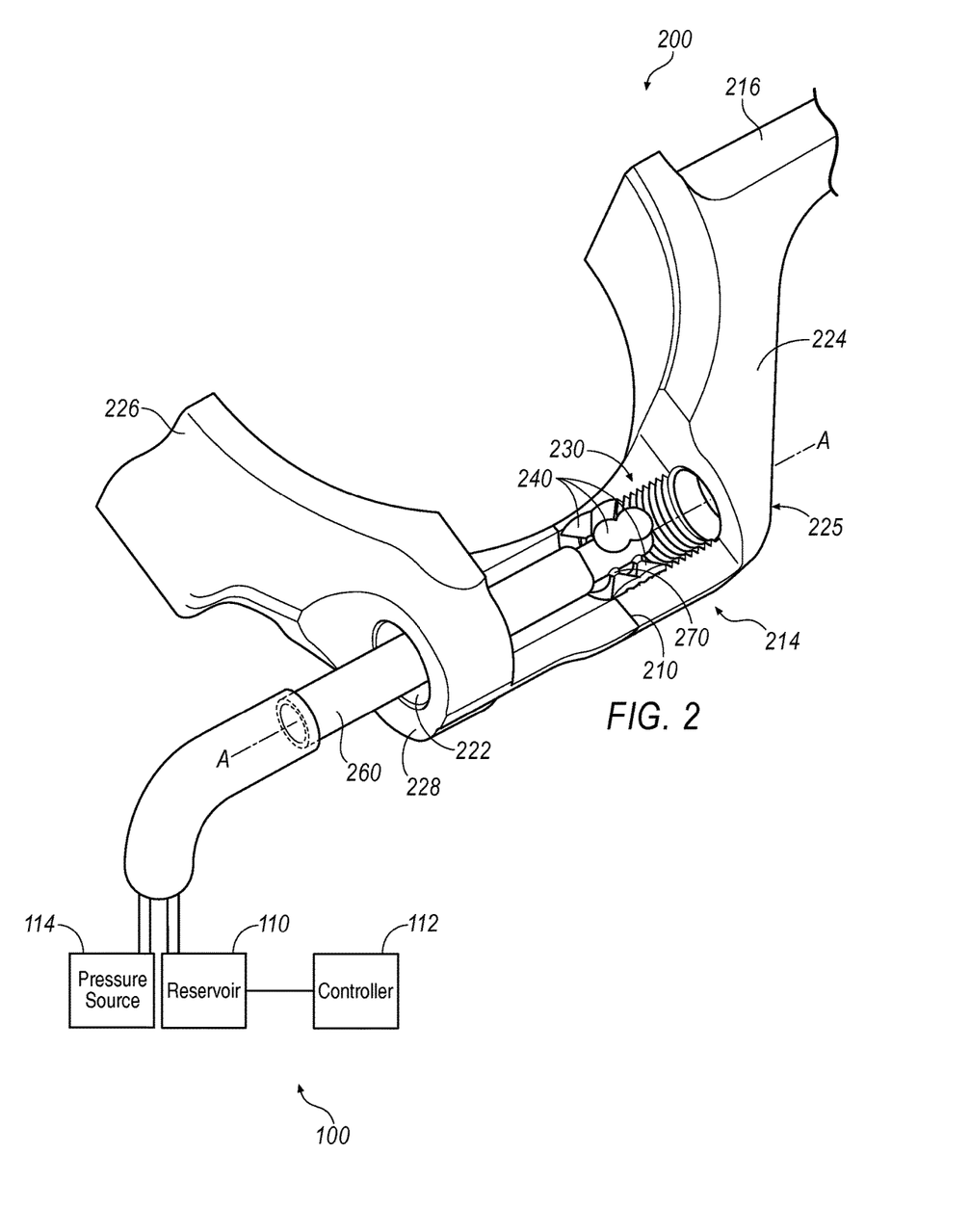
FIG. 2 is an exploded view of an exemplary connecting rod assembly and adhesive plunger.

Turning to FIG. 2, an adhesive coating 240 may be applied to the threaded opening 222, e.g., prior to positioning the fastener 232. The coating 240 may be evenly distributed and applied to the opening threads 230, e.g., with a substantially hollow application plunger 260, as will be described further below. Alternatively, as will be further described below the coating 240 may be applied by a fluid bath process. The coating may include, for example, any type of thread locking adhesive that is convenient. The coating 240 may serve several purposes, including, but not limited to, creating additional friction between the fastener 232 and the opening threads 230, or increasing the clamping load created when the fasteners 232 are secured to the connecting rod portion 224, merely as examples. The coating 240 may also generally prevent corrosion of the components of the joint 210, e.g., fastener 232, or threads 230. The coating may also improve ease of assembly of the connecting rod 200, e.g., providing a consistent dynamic friction between the threads 230, 238 while the threads 230, 238 are being engaged. After assembly of the fastener 232 to the connecting rod 200, the adhesive coating 240 may increase friction between the threads 230, 238, e.g., due to a reaction of the adhesive coating 240 to the anaerobic effect of the engagement of the threads 230, 238. In one exemplary illustration, the adhesive coating 240 includes an iron-oxide coating. An iron-oxide coating may advantageously resist loosening of the fastener 232 from the opening 222 after engagement of the threads 230, 238.

The adhesive coating 240 may be substantially uniform in thickness along the threads 230 or a portion thereof. For example, as illustrated in FIG. 1B, the coating 240 may have a thickness t as measured between a peak of the threads 230 and the surface of the coating 240. Moreover, as also shown in FIG. 1B the thickness t may be substantially uniform or consistent along at least a portion of the threads 230, such that the coating 240 thickness as measured from a surface of one of the threads to the coating surface 240, in a direction orthogonal to the thread surface, is generally equal to the thickness t. In one exemplary illustration, the thickness t is substantially uniform to an extent that a substantially uniform force may be applied to the fastener 232 (not shown in FIG. 2) within the opening 222, resulting in a substantially uniform rotational speed of the fastener 232 as it engages one or more of the threads 230. In another exemplary illustration, the force is uniform to an extent that a tool (not shown in FIG. 1B) associated with turning the fastener 232 to engage the threads 230 does not experience noticeable or significant fluctuations in a reaction torque associated with installation of the fastener 232 to the threads 230 coated with the adhesive coating 240.

In one exemplary illustration, the fastener 232 has a first coating, e.g., a corrosion-resistant coating, while a second coating, e.g., adhesive coating 240, is applied to the threaded opening 222. In this illustration, interference between the two coatings may be minimized or eliminated entirely due to the coatings being applied to separate components. Accordingly, inappropriate interaction between the two coatings prior to assembly, e.g., during transport, is substantially reduced or eliminated. Moreover, the regions of the fastener 232 where the separate coatings influence assembly and/or operation of the fastener 232 may be spaced apart, such that the operation of the adhesive coating 240 is not affected by the presence of any coating applied to the fastener 232, e.g., a corrosion-resistant coating.

More specifically, the fastener 232 may generally be engaged with or in contact with the connecting rod solely at the interface between the threads 238, 230, and at the interface between the mating face 236 of the fastener head 234 and the spot face 228 of the bearing cap 226. In one example, the corrosion-resistant coating may be applied to the entire fastener 232, including the threads 238. For example, the fastener 232 may be coated in a dipping process. In these examples, the corrosion-resistant coating on the threads 238 may take up clearance between the threads 238, 230, and/or provide an increased coefficient of friction, thereby reducing a tendency of the joint between the fastener 232 and the connecting rod assembly 200 to loosen, e.g., during engine operation. In other examples, corrosion-resistant coating is not present on the threads 238, and thus in such examples the corrosion resistant coating only contacts the connecting rod assembly 200 directly at the spot face 228. Regardless of whether any coating, such as a corrosion-resistant coating, is applied to the threads 238 of the fastener, at the end of the fastener 232 that is spaced away from the fastener head 234 the adhesive coating 240 acts between the fastener 232 and the threads 230, and the operation of the adhesive coating 240 is not influenced by the presence or lack thereof of the corrosion-resistant coating at the interface between the mating face 236 and the spot face 228.

Additionally, damage of the adhesive coating 240 may be minimized by the application of the adhesive coating 240 to the internal threads of the opening 222, as opposed to external threads of the fastener 232. For example, during transport of the threaded components such as the fastener 232 and/or the connecting rod assembly 200 and prior to assembly of the fastener 232 and connecting rod assembly 200, the positioning of the adhesive coating 240 within the opening 222 will generally protect the adhesive coating 240 from impacts with other objects due to, e.g., jarring, vibration, or other incidental contact during shipment or transport.

As best seen in FIG. 2, the opening 222 may extend entirely through the connecting rod assembly 200, defining an aperture 225 at the end of the opening 222 adjacent the threads 230 of the opening 222. As a result, the opening 222 does not constrain insertion of the fastener 232 (not shown in FIG. 2) other than by engagement of the mating threads 230, 238. The fastener 232 may in some examples be allowed to extend through the aperture 225 upon insertion and engagement of the threads 230, 238. Additionally, the aperture 225 may allow excess coatings that are loosened from the fastener 232 and/or the connecting rod assembly 200, e.g., during transport or assembly, to fall out of the opening 222. Accordingly, interference of any excess, loosened, or damaged coating, e.g., adhesive coating 240, or a corrosion-resistant coating on the fastener 232 may be minimized. Additionally, the aperture 225 may allow excess adhesive coating 240 to flow out of or otherwise be removed from the opening 222 and/or the threads 230.

As best seen in FIG. 2, in one exemplary illustration the coating 240 may be applied using a spray assembly 100. The spray assembly 100 may include a fluid reservoir 110 for the coating and the substantially hollow spray plunger 260. The spray assembly 100 may further include various fluid spray system components, including an automated controller 112, an air source 114, and associated fluid lines, merely as examples. The spray assembly 100 may also include a device for manipulating the plunger 260, e.g., automatically according to instruction from the controller 112. In one exemplary illustration, a device for inserting and/or rotating the plunger 260 is provided, such as an articulating robot that manipulates the spray plunger 260 as desired.

The pressure source 114 may be used to supply a pressurized gas, e.g., air, to the plunger 260, to facilitate application of the coating 240. Additionally, pressurized air may be used to remove debris from the joint 210 using the pressurized air, as further described below. The pressure source 114 may include, for example, a compressor, compressed air canister, or any other generally high pressure gas source. The pressurized gas may also be used to purge the lines of the spray assembly 100.

The exemplary spray plunger 260 includes one or more coating apertures 270 to provide a desired spray pattern. As will be discussed below in greater detail, the coating aperture 270 may be of any shape or size that is convenient. As noted above, the adhesive coating 240 may be applied in a uniform or substantially uniform thickness along the threads 230 of opening 222. A uniform thickness may be facilitated by the selection and positioning of coating apertures 270, as will be described further below. The coating apertures 270 may thus generally cooperate to apply the coating 240 in a uniform manner that substantially prevents inconsistencies in coating thickness.

A uniform thickness of the adhesive coating 240 may generally facilitate assembly of the fastener 232 to the connecting rod assembly 200, and in particular may minimize binding between the mating threads 230, 238 during assembly. By contrast, where adhesive coating 240 is applied, for example, using a dipping process the resulting coating thickness may be more uneven across the threads 230 of the opening. Inconsistencies in the thickness of the adhesive coating 240 may result in a correspondingly inconsistent reaction of the mating threads 230, 238 during engagement. For example, a force required to turn the fastener 232 within the opening 222 as the threads 230, 238 are engaging may be non-uniform as the threads 230, 238 move against one another and the fastener 232 encounters greater or lesser thicknesses of the adhesive coating 240.

The spray plunger 260, upon activation by the controller 112, may be inserted into the openings 220, 222 placing the coating aperture 270 adjacent the threads 230. Upon reaching the threads 230, the coating 240 may be sprayed directly onto the threads 230 as the plunger 260 rotates about an axis A-A of the plunger. Accordingly, the coating 240 is generally evenly applied, e.g., in a substantially uniform thickness, about the circumference of the opening 220, 222. In one illustration, the plunger 260 is rotated and translated at a generally constant speed during coating application, thereby providing the coating in a substantially uniform thickness along the threads 230.

The controller 112 may facilitate a generally automated application of the coating 240. For example, the controller 112 may control rotation of the plunger 260 at a predetermined speed, insertion and/or ejection timing of the plunger 260 from the opening 220 and/or opening 222. Thus, the coating 240 may be applied evenly in a desired thickness, as determined according to the length of time the spray is activated, how quickly the spray plunger 260 is rotated, etc.

The spray assembly 100 may also allow an operator to easily adjust a friction factor imparted to the joint 210 by the coating 240. For example, an operator may adjust rotational speed of the plunger 260, pressure within the fluid reservoir 110, the length of time the plunger 260 is activated, selection of a coating 240, or any other factors that may affect the friction factor imparted to the joint 210 by the coating 240 on the threads 230. In one illustration, the friction between the threads 230, 238 may be increased by increasing the amount and/or thickness of the coating applied to the threads 238.

The friction factor determined by the coating 240 may generally be independent of a second friction factor imparted to the joint 210 by friction between the mating face 236 of the fastener head 234 and the spot face 228 of the bearing cap 226 (see FIG. 1). This independence may generally be promoted, for example, by a generally uniform application of the coating 240 to the internal threads 230. A uniform application may generally reduce stripping of the coating 240 that may occur during installation of the fastener 232. Accordingly, an amount of coating 240 that escapes from the opening 222 between the mating face 236 and the spot face 228 during securement of the fastener 232 is reduced or eliminated entirely. For example, the substantially uniform and precise application of the coating 240 may reduce the amount of coating 240 that is sheared off of the threads 230 during securement of the fastener 232.

Accordingly, an operator may increase or decrease the friction factor imparted to the joint 210 by the coating 240, i.e., friction between the fastener threads 238 and corresponding threads 230 of the opening 222. Further, adjustments of the friction factor determined by the coating 240 do not affect the friction between the mating face 236 of the fastener head 234 and the spot face 228 as a result of the reduced stripping of coating 240 during securement of the fastener 232. Accordingly, any effect the coating 240 may have on the relationship between the fastener head 234 and the spot face 228 is substantially eliminated. For example, an amount of coating 240 may be increased or decreased without resulting in deviations in thickness where the coating 240 is applied, as may otherwise occur in other coating operations, e.g., dipping.

The spray plunger 260 may be manually manipulated as an alternative to the generally automated operation described above. For example, an operator may manually insert the plunger 260 into the openings 220, 222, while rotating the plunger 260 as desired.

Figures 3A, 3B, 3C:
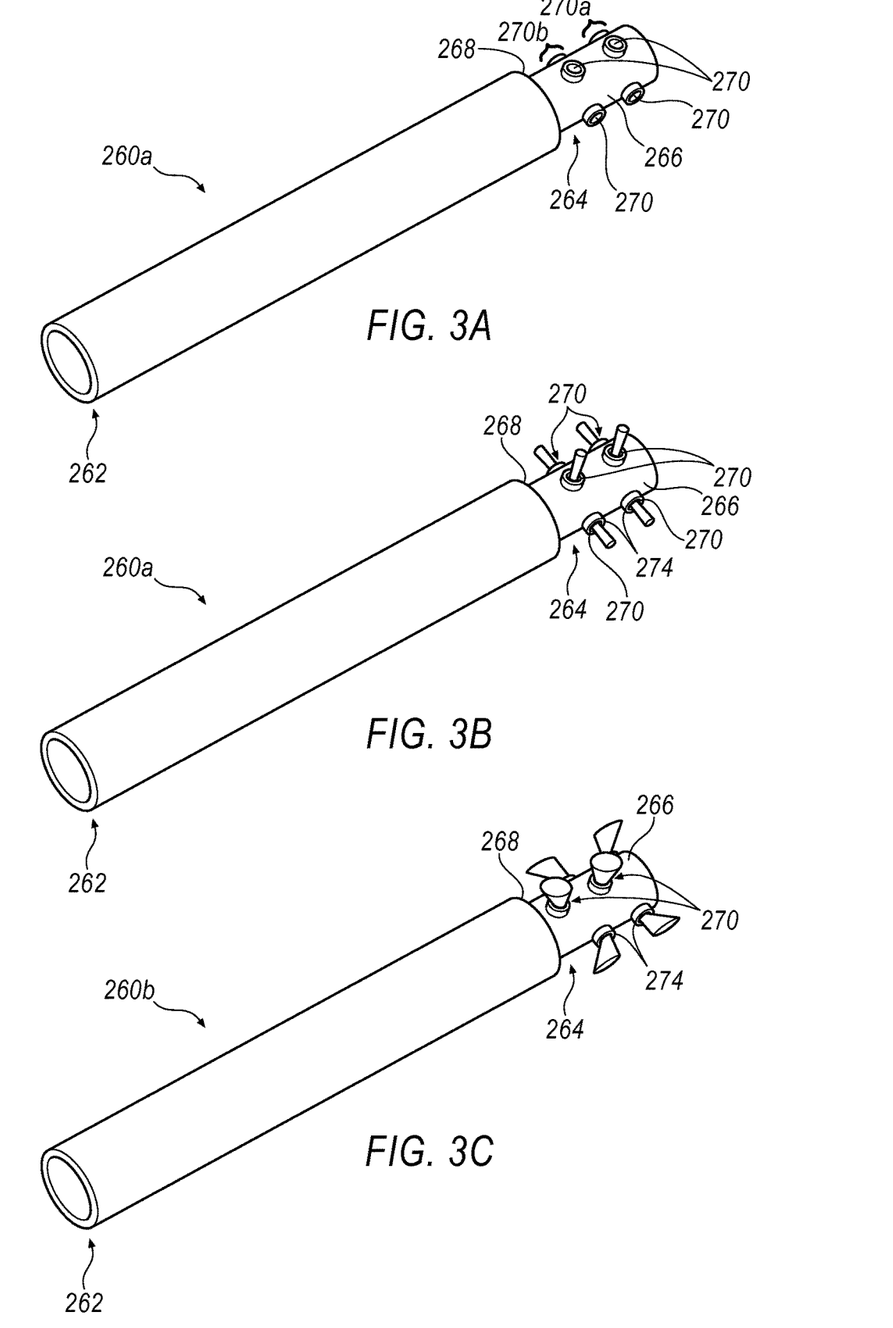
FIG. 3A is a perspective view of an exemplary plunger.
FIG. 3B is a perspective view of a second exemplary plunger.
FIG. 3C is a perspective view of a third exemplary plunger.

Turning now to FIGS. 3A-3C, exemplary spray plungers 260 are illustrated. Generally, the exemplary spray plungers 260 include a cylinder having a first end 262 and a second end 264 with a stepped neck 268. The plunger 260 may be of any shape or size to allow the plunger 260 to be extended into the openings 220, 222 and rotated to provide a uniform coating 240 on the threads 230. The plunger first end 262 may be in fluid communication with the spray assembly 100.

The second end 264 may be generally closed and may include one or more nozzles or apertures 270 for spraying a coating 240. The apertures 270 may be integrally formed with the second end 264 and/or the plunger 260, or may be separately formed and secured to the second end 264. The apertures 270 may extend radially outwardly from an outer periphery 266 of the second end 264, defining a nozzle or passage through the aperture 270 that allows pressure or fluid to pass from the plunger first end 262 to the second end 264, and out the apertures 270.

The apertures 270 may be positioned in a uniform or irregular pattern, depending on the desired coating. The apertures 270 may be configured to apply the coating 240, provide pressurized blast air within the opening 222, or both, depending on the application. For example, debris may be removed from the openings 220, 222 by applying pressurized blast air to the openings 220, 222 prior to spraying the coating 240. The spray plunger 260 may include an auxiliary blast air hole (not shown) or utilize the apertures 270 to apply the pressurized air.

The apertures 270 may be positioned about an outer periphery 266 of the second end 264 in any manner desired. As best seen in FIGS. 3A and 3B, the apertures 270 may be generally equidistantly spaced about the outer periphery 266 of the second end 264, thereby promoting a more even application of a coating by way of the apertures 270. Alternatively, the apertures 270 may be provides in one or more closely spaced groups, thereby focus a spray from the apertures 270 as a result of the grouping of the apertures 270.

The apertures 270 may be provided in one or more discrete rows spaced axially along the plunger 260. For example, as best seen in FIG. 3A the apertures 270 may be provided in two separate rows 270a, 270b, with four apertures 270 in each of the rows 270a, 270b. Additionally, the apertures 270 in each of the axially spaced rows 270a, 270b are illustrated as being circumferentially aligned with those in the adjacent row. Alternatively, the apertures 270 in one row, e.g., row 270a, may be offset from those in an adjacent row, e.g., row 270b.

The apertures 270 themselves may be configured to focus or spread a coating spray exiting the apertures 270. For example, FIGS. 3A and 3B illustrate apertures 270 that apply the coating 240 such that the spray extends radially from the plunger 260 in a generally narrow, tightly controlled spray pattern, as may be useful for smaller coating areas that must be sprayed with more precision and/or in smaller amounts. Accordingly, where a relatively small coverage of the threads 230 with the coating 240 is desired, e.g., as measured axially along the opening 222, the plunger 260a may allow for a more precise and even application of the coating 240 within the opening 222.

Alternatively, as shown in FIG. 3C, a plunger 260b may include apertures 270 that are staggered or offset with respect to one another. Moreover, the apertures 270 illustrated in FIG. 3C generally define varied angles for the spray of the coating 240 with respect to the plunger 260b. More specifically, apertures 270 furthest away from the first end 262 may direct the coating spray upwardly, i.e., away from the stepped neck 268 (not shown in FIG. 3C) of the plunger 260, while apertures 270 closest to the first end 262 direct the coating spray downwardly, i.e., toward the first end 262 of the plunger 260b. The combination of various spray angles may increase coverage of the spray, facilitating coverage of an axially longer portion of the opening 222 with the coating 240. Additionally, the varied shapes, sizes and angles of the apertures 270 may allow the operator to customize a spray pattern to direct the exiting flow of air or coating 240.

The spray plunger 260, including the apertures 270, may be formed of a rigid material that is able to house the coating apertures 270. The rigid material may include, but is not limited to, aluminum, brass, bronze, stainless steel, rigid plastic or any other composite material that is convenient. The rigid material may also include a mixture of metal and plastic.

Figure 4:
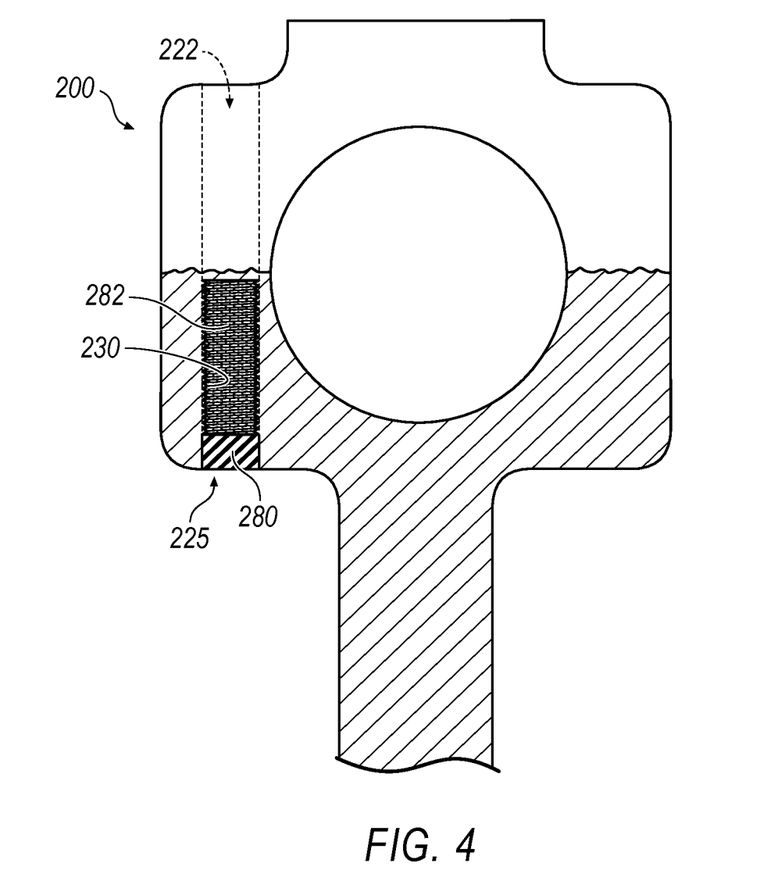
FIG. 4 is a partial section view of an exemplary multi-piece assembly, including a connecting rod, during another exemplary thread coating operation.

Turning now to FIG. 4, another exemplary method of applying a coating 240 to the threads 230 of connecting rod assembly 200 is described in further detail. More specifically, the threads 230 may be coated using a fluid bath. For example, a coating fluid 282 may be injected into the opening 222. A plug may be inserted into the aperture 225 of the opposite end of the connecting rod assembly 200, such that the coating fluid 282 generally fills up the opening 222, including at least a portion, and in some cases an entire portion, of the threads 230. Coating fluid 282 may generally adhere to the inner surfaces of the opening 222, including the threads 230, over a predetermined amount of time. In one exemplary illustration, the coating fluid 282 is a conversion coating, e.g., a black oxide coating. Moreover, the coating fluid 282 may adhere to the inner surfaces of the opening 222 form a coating having a greater thickness where the coating fluid 282 is allowed to stand in the opening 222 for a greater period of time. In this exemplary illustration, the fluid bath process may result in a substantially uniform coating, e.g., a friction enhancing coating 240. More specifically, in contrast to previous approaches, e.g., dipping, the coating fluid 282 adheres in a generally consistent manner during exposure of the coating fluid 282 to the inner surfaces of the opening 222. Accordingly, the resulting coating 240 (e.g., as shown in FIG. 1B) is applied substantially uniformly to the threads 230. Moreover, the fluid bath process may be modified, e.g., by lengthening or shortening a period of time that the inner surfaces of the opening 222 are exposed to the fluid 282, to provide a correspondingly thicker or thinner coating 240.

Figure 5:
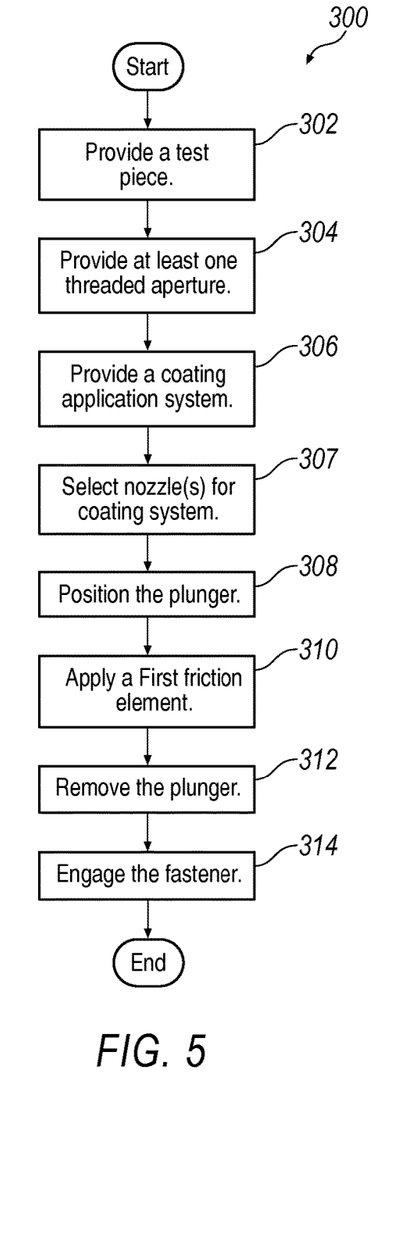
FIG. 5 is an exemplary method of providing a coating for a threaded connection.

Turning now to FIG. 5, an exemplary process 300 of producing a multi-piece assembly, e.g., a connecting rod is described. Process 300 may begin at block 302, where a multi-piece assembly is supplied. For example, as discussed above a multi-piece assembly such as a connecting rod assembly 200 may be formed having a piston end 212 and a crank shaft end 214. A load bearing shaft 216 may connect the two ends 212, 214. As discussed above, the connecting rod assembly 200 crank shaft end 214 may include a bearing cap 226 that may be mechanically separated from a connecting rod portion 224.

Proceeding to block 304, the multi-piece assembly may be provided with at least one threaded opening. For example, the connecting rod assembly 200 may be machined, e.g., by threading at least one of the openings 220, 222 on the bearing cap 226 or the connecting rod portion 224 to provide threads 230. In one exemplary illustration, a first one of the components of the multi-piece assembly 200, e.g., the bearing cap 226, is unthreaded and a second component, e.g., the connecting rod portion 224, is threaded. Additionally, the multi-piece assembly may be provided with a fastener head mounting face 228.

Process 300 may then proceed to block 306, where a coating application system may be provided. For example, an application spray assembly 100 and at least one application member, e.g., plunger 260, may be provided. The plunger 260 may be fluidly connected to a spray assembly 100. The spray assembly 100 may provide a pulse or burst of relatively high-pressure fluid, e.g., air, from a pressure source 114 and a coating that influences a first friction factor associated with the multi-piece assembly, as discussed above. Process 300 may then proceed to block 307.

At block 307, one or more nozzles 270 may be selected for use with the plunger 260. As described above, the nozzles 270 may be selected and positioned to facilitate a substantially uniform application of the adhesive coating 240 to the threads 230. More specifically, the nozzles 270 may be distributed uniformly, or may be spaced equidistantly from one another, about the plunger 260 or portions thereof to facilitate application of a uniform layer of the adhesive coating 240 about the plunger or portions thereof, respectively.

Proceeding to block 308, the plunger 260 may be positioned adjacent the opening 220, 222 of the connecting rod assembly. Upon positioning, a spray controller 112 may insert the plunger 260 a predetermined distance into the opening 220, 222 and activate the high pressure air to prepare the opening 220, 222 for the application of the coating 240. The air may remove any debris from at least one of the openings and in at least one of the application member outlets 270 or nozzles. Removal of any debris may generally reduce galling or thread damage due to metal or other particles within the opening, e.g., that remain after the machining process. Removal of the debris also may further promote a uniform application of the coating 240 about the threads 230.

Proceeding to block 310, where the application member, e.g., plunger 260, may be re-positioned within the opening 220, 222, adjacent the threads 230 at a predetermined depth. The application member 260 may be inserted manually by an operator or automatically, e.g., with a control system 112. After insertion into the openings 220, 222, the plunger 260 may be rotated 360° about the threads 230 while simultaneously spraying a friction-affecting material, e.g., adhesive coating 240. The plunger 260 may also be moved along the threads 230 while spraying the friction material. The coating 240 may be applied in a substantially uniform and continuous layer on the threads 230. The thickness of the layer may be determined at least in part by the amount of time the application member 260 is activated as well as the rate at which the application member 260 rotates and/or moves along the threads 230.

After coating 240 has been applied, process 300 may proceed to block 312. At block 312, the application member 260 may be removed from the openings 220, 222.

Proceeding to block 314, a fastener may be engaged with the multi-piece assembly. For example, as described above the bearing cap 226 may be positioned adjacent the crank shaft rod end 214, around the crankshaft, e.g., during final installation of an exemplary connecting rod into an engine. A piston may be positioned on the opposite end of the connecting rod, i.e., at the piston end 212. A fastener 232 may then be inserted into at least one of the openings 220, 222 and turned, thereby engaging the threads 238 with the threads 230 of the opening 222. The two halves of the crankshaft end may thereby be pulled tight around the crankshaft. In one example, a load surface of the multi-piece assembly, e.g., spot face 228, may be abutted with a mating surface of the fastener 232, e.g., fastener head 236, or a washer interposed between the fastener head 236 and spot face 228. The resulting securement of the fastener threads 238 to the threads 230 of the multi-piece assembly may create tension in the fastener 232, thereby securing the bearing cap 226 to the connecting rod portion 224.

Figure 6:
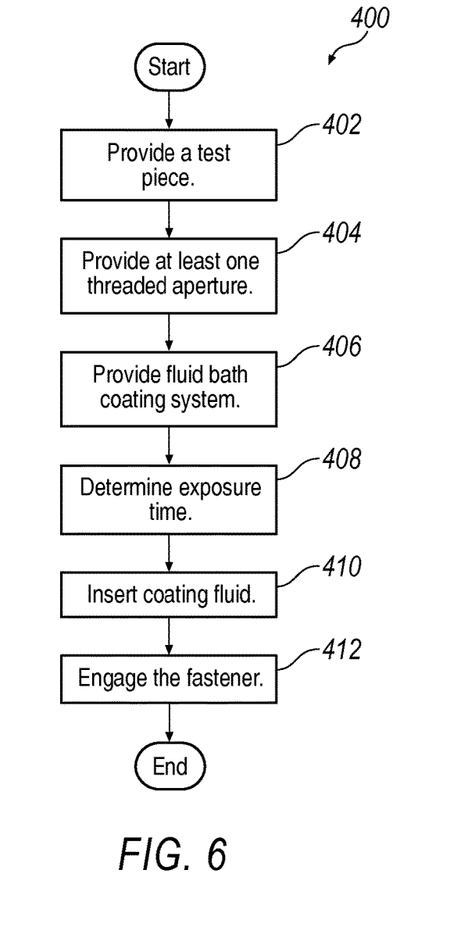
FIG. 6 is another exemplary method of providing a coating for a threaded connection.

Turning now to FIG. 6, another exemplary process 400 of producing a multi-piece assembly such as a connecting rod is described. Process 400 may begin at block 402, where a multi-piece assembly is supplied, e.g., a multi-piece assembly such as a connecting rod assembly 200. Connecting rod assembly may be formed having a piston end 212 and a crank shaft end 214, and a load bearing shaft 216 connecting the two ends 212, 214. As discussed above, the connecting rod assembly 200 crank shaft end 214 may include a bearing cap 226 that may be mechanically separated from a connecting rod portion 224.

Proceeding to block 404, the multi-piece assembly may be provided with at least one threaded opening, e.g., in a machining process such that at least one of the openings 220, 222 on the bearing cap 226 or the connecting rod portion 224 includes a set of inner threads, e.g., threads 230. Moreover, as noted above a first one of the components of the multi-piece assembly 200, e.g., the bearing cap 226, may be unthreaded while a second component, e.g., the connecting rod portion 224, is threaded. Additionally, the multi-piece assembly may be provided with a fastener head mounting face 228.

Process 400 may then proceed to block 406, where a fluid bath coating application system may be provided. For example, as described above a fluid bath may be used to apply a coating 240 to threads 230 of a connecting rod assembly 200. More specifically, opening 222 may be partially filled with a coating fluid 282, thereby allowing a coating 240 to form over a predetermined exposure period on the threads 230.

Proceeding to block 408, an exposure time may be determined. As noted above, a greater exposure time of the coating fluid 282 may result in a greater thickness of a resulting coating 240. Accordingly, an exposure time may be determined in block 408 that corresponds to a desired thickness of the coating 240. Moreover, a thickness of coating 240 may be generally modified easily in a mass manufacturing environment, as changing the predetermined time of exposure may provide a corresponding reduction or increase in the resulting thickness of the coating 240.

Proceeding to block 410, a coating fluid may be inserted or injected, e.g., into opening 222 of the connecting rod assembly 200. For example, as described above a fluid bath may be created within the opening 222 by inserting a plug 280 into an opposite end aperture 225, and filling the opening 222 with a coating fluid 282. The plug 280 may form a generally fluid-tight barrier, preventing escape of the coating fluid 282 through aperture 225. An amount of coating fluid 282 may be sufficient to cover a portion of, or an entire portion of, threads 230, such that the coating 240 is formed on the threads 230 or portion thereof. Plug 280 may be removed at the conclusion of the fluid bath process, allowing excess fluid 282 to escape through the aperture 225. Alternatively, or in addition, fluid 282 may be evacuated from the opening 222.

After coating 240 has been applied, process 400 may proceed to block 412, where a fastener may be engaged with the multi-piece assembly. For example, as described above the bearing cap 226 may be assembled to a corresponding crankshaft portion 224 with a fastener 232, e.g., by inserting the fastener into at least one of the openings 220, 222. The fastener 232 may be turned, thereby engaging the threads 238 with the threads 230 of the opening 222, and tightening the two halves of the crankshaft end around the crankshaft. In one example, a load surface of the multi-piece assembly, e.g., spot face 228, may be abutted with a mating surface of the fastener 232, e.g., fastener head 236, or a washer interposed between the fastener head 236 and spot face 228. The resulting securement of the fastener threads 238 to the threads 230 of the multi-piece assembly may create tension in the fastener 232, thereby securing the bearing cap 226 to the connecting rod portion 224.

As described above, in some exemplary illustrations a second friction material, e.g., a coating to prevent corrosion, may be applied to the fastener head 236 or the fastener head mounting face 228. The second friction material may thereby establish a second friction factor or effect on the joint between the fastener 232 and a multi-piece assembly, e.g., the connecting rod assembly 200. The second friction factor may be advantageously independent of a friction factor defined by the coating 240 applied to the threads 230. For example, the as described above, the coating 240 applied to the threads 230 and the corrosion coating applied to the fastener 232 may result in first and second friction factors that both affect the application of torque on the fastener 232 independently.

Accordingly, in a process of producing a plurality of multi-piece assemblies, the friction imparted to the first interface defined by the coating 240 on the threads 230 may be altered without affecting the second interface defined by the fastener head 236 and mounting face 228. For example, adjustments in the amount of coating 240 applied to the threads 230 may be carried out without affecting the uniformity of the application, thereby reducing or eliminating stripping of the coating 240 and preventing interference with the second interface. More specifically, loose coating material, e.g., coating 240, stripped during or after assembly may come between the fastener head 236 and mounting face 228. As stripping of the coating 240 is minimized by the uniformity of the coating 240, interference of the coating 240 with the second interface between the fastener head 236 and mounting face 228 is substantially reduced or even eliminated.

The independent adjustment of the friction interfaces may be particularly advantageous where an increase in coating 240 is desired during a production run of multi-piece assemblies. More specifically, the amount of coating 240, e.g., a thickness of the coating 240, length of threads 230 to which coating 240 is applied, etc., may be increased without a corresponding increase in loose coating material, e.g., from coating 240 being stripped or loosened during assembly, that would otherwise interfere with the interface between the fastener head 236 and mounting face 228.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
applying a first coating material on a threaded region of an opening in a multi-piece assembly;

inserting at least one fastener to the threaded region, the fastener including a mating thread selectively secured to the threaded region of the opening to create a first friction interface between the fastener and the multi-piece assembly; and tensioning the fastener between a load surface of the multi-piece assembly and a mating thread of the fastener to define a second friction interface between the multi-piece assembly and the fastener, the second friction interface being spaced away from the threaded region such that the first coating material does not influence the second friction interface.

2. The method of claim 1, further comprising establishing the first coating material as being applied solely within the opening and in a substantially uniform thickness upon the threads.

3. The method of claim 1, further comprising adjusting the first friction interface independent of the second friction interface.

4. The method of claim 3, wherein adjusting the first friction interface includes adjusting an amount of the first coating material applied to the threaded region, thereby increasing friction at the first friction interface without affecting friction at the second friction interface.

5. The method of claim 1, further comprising establishing the multi-piece assembly as a connecting rod, the opening defined by the connecting rod and extending through a bearing cap and a crankshaft portion of the connecting rod, wherein the fastener selectively secures the bearing cap to the crankshaft portion.

6. The method of claim 1, wherein applying the first friction material includes inserting at least one plunger into the opening.

7. The method of claim 6, wherein applying the first coating material includes rotating the plunger within the opening.

8. The method of claim 1, wherein applying the first coating material includes filling the opening at least partially with a coating fluid.

9. The method of claim 1, further comprising providing a second coating material at the second friction interface.

10. The method of claim 9, wherein the second coating material includes a corrosion-resistant coating.

11. The method of claim 1, wherein the first coating material is a thread locking adhesive.

12. A method, comprising:
applying a first coating material on a threaded region of an opening in a first multi-piece assembly included in plurality of multi-piece assemblies;
inserting at least one fastener to the threaded region, the fastener including a mating thread selectively secured to the threaded region of the opening to create a first friction interface between the fastener and the first multi-piece assembly, the fastener having a second coating material;
tensioning the fastener between a load surface of the multi-piece assembly and a mating thread of the fastener to define a second friction interface between the multi-piece assembly and the fastener, the second friction interface being spaced away from the threaded region such that the first coating material does not influence the second friction interface;
adjusting an amount of the first coating material applied to the threaded region in a subsequent multi-piece assembly, thereby increasing friction at the first friction interface of the subsequent multi-piece assembly compared with the first multi-piece assembly, the friction at the second friction interfaces of the first multi-piece assembly and the subsequent multi-piece assembly being substantially equal.

13. The method of claim 12, further comprising:
establishing the multi-piece assemblies as connecting rods;
wherein the first coating material is a thread locking adhesive and the second coating material includes a corrosion-resistant coating.

14. The method of claim 12, further comprising establishing the first coating material as being applied solely within the opening and in a substantially uniform thickness upon the threads.

15. The method of claim 12, wherein applying the first friction material includes inserting at least one plunger into the opening and spraying the first friction material onto the threaded region.

16. The method of claim 12, wherein applying the first coating material includes filling the opening at least partially with a coating fluid.

17. A connecting rod assembly, comprising:
a connecting rod portion defining an aperture configured to receive a piston pin at a first end, the connecting rod portion defining an opening having a first thread, the first thread having a coating material applied thereon, the coating material defining a substantially uniform thickness axially with respect to the opening along the first thread; and
a bearing cap secured to the connecting rod portion with a fastener defining a mating thread engaged with the first thread of the connecting rod portion.

18. The connecting rod assembly of claim 17, wherein the fastener is tensioned against the bearing cap at an end of the fastener spaced away from the first thread, such that the fastener defines first and second friction interfaces between the connecting rod assembly and the fastener that are spaced axially from each other such that the first coating material does not influence the second friction interface.

19. The connecting rod assembly of claim 17, further comprising a fastener coating, the fastener coating covering the fastener at least at the second friction interface.

20. The connecting rod assembly of claim 17, wherein the coating material is a thread locking adhesive.

* * * * *